US012505950B2

(12) United States Patent
Choi

(10) Patent No.: US 12,505,950 B2

(45) Date of Patent: Dec. 23, 2025

(54) ELECTRONIC COMPONENT, AND METHOD OF MANUFACTURING THEREOF

(71) Applicant: SAMSUNG ELECTRO-MECHANICS CO., LTD., Suwon-si (KR)

(72) Inventor: Min Sung Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/088,009

(22) Filed: Dec. 23, 2022

(65) Prior Publication Data

US 2023/0128594 A1 Apr. 27, 2023

Related U.S. Application Data

(63) Continuation of application No. 15/011,150, filed on Jan. 29, 2016, now Pat. No. 11,562,851.

(30) Foreign Application Priority Data

Jan. 30, 2015 (KR) ........................ 10-2015-0015309

(51) Int. Cl.

| | |
|---|---|
| ***H01F 27/29*** | (2006.01) |
| ***H01F 17/00*** | (2006.01) |
| ***H01F 17/04*** | (2006.01) |
| ***H01F 41/04*** | (2006.01) |
| ***H01F 41/10*** | (2006.01) |

(52) U.S. Cl.

CPC ....... *H01F 27/292* (2013.01); *H01F 17/0013* (2013.01); *H01F 17/04* (2013.01); *H01F 41/046* (2013.01); *H01F 41/10* (2013.01); *H01F 2017/048* (2013.01)

(58) Field of Classification Search

CPC .... H01F 27/292; H01F 17/0013; H01F 17/04; H01F 2017/048

USPC .................................................. 336/192, 200

See application file for complete search history.

(56) References Cited

U.S. PATENT DOCUMENTS

| | | | | |
|---|---|---|---|---|
| 4,984,130 | A | 1/1991 | Dull et al. | |
| 5,339,068 | A * | 8/1994 | Tsunoda | H01C 1/142 338/308 |
| 5,598,136 | A | 1/1997 | Kano et al. | |
| 5,821,843 | A | 10/1998 | Mamada et al. | |
| 5,963,416 | A | 10/1999 | Honda et al. | |
| 6,120,884 | A | 9/2000 | Igarashi et al. | |
| 6,214,685 | B1 * | 4/2001 | Clinton | H01C 7/18 438/957 |
| 6,246,310 | B1 | 6/2001 | Uchida et al. | |
| 6,373,368 | B1 | 4/2002 | Shikama et al. | |

(Continued)

FOREIGN PATENT DOCUMENTS

| | | | | |
|---|---|---|---|---|
| CN | 105940469 A | * | 9/2016 | H01F 17/0033 |
| CN | 112582133 B | * | 2/2023 | H01F 27/255 |

(Continued)

*Primary Examiner* — Shawki S Ismail

*Assistant Examiner* — Joselito S. Baisa

(74) *Attorney, Agent, or Firm* — Morgan, Lewis & Bockius LLP

(57) ABSTRACT

An electronic component includes a magnetic body containing magnetic metal powder; and external electrodes disposed on an outer portion of the magnetic body. The external electrodes include first plating layers in direct contact with the magnetic body.

15 Claims, 8 Drawing Sheets

100

I - I'

(56) References Cited

U.S. PATENT DOCUMENTS

| | | | | |
|---|---|---|---|---|
| 6,381,118 | B1 * | 4/2002 | Yokoyama | H01C 17/283 361/309 |
| 7,212,094 | B2 | 5/2007 | Matsutani et al. | |
| 7,507,135 | B2 | 3/2009 | Lee et al. | |
| 7,719,398 | B2 | 5/2010 | Tsuzuki | |
| 7,772,956 | B2 | 8/2010 | Toi et al. | |
| 7,933,113 | B2 | 4/2011 | Motoki et al. | |
| 8,125,763 | B2 | 2/2012 | Kobayashi et al. | |
| 8,139,342 | B2 | 3/2012 | Takeuchi et al. | |
| 8,174,816 | B2 * | 5/2012 | Seo | H01G 4/232 361/306.3 |
| 8,330,568 | B2 | 12/2012 | Konoue et al. | |
| 8,723,629 | B1 | 5/2014 | Liu et al. | |
| 8,975,997 | B2 | 3/2015 | Tonoyama et al. | |
| 9,378,884 | B2 | 6/2016 | Kim et al. | |
| 9,558,890 | B2 | 1/2017 | Hattori et al. | |
| 9,583,251 | B2 | 2/2017 | Moon et al. | |
| 9,647,315 | B2 | 5/2017 | Yamatogi et al. | |
| 9,659,704 | B2 | 5/2017 | Yang et al. | |
| 9,704,640 | B2 | 7/2017 | Choi et al. | |
| 9,728,316 | B2 | 8/2017 | Mimura et al. | |
| 9,831,023 | B2 | 11/2017 | Lee et al. | |
| 9,945,042 | B2 | 4/2018 | Cha et al. | |
| 9,984,805 | B2 | 5/2018 | Kudo et al. | |
| 10,734,152 | B2 * | 8/2020 | Ryu | H01F 17/0013 |
| 10,875,095 | B2 | 12/2020 | Inoue et al. | |
| 10,875,995 | B2 | 12/2020 | Niessner | |
| 11,120,934 | B2 | 9/2021 | Kubota et al. | |
| 11,948,749 | B2 * | 4/2024 | Ishizuya | H01G 4/224 |
| 12,100,557 | B2 * | 9/2024 | Takata | H01G 4/248 |
| 2001/0017420 | A1 | 8/2001 | Wao et al. | |
| 2001/0055704 | A1 | 12/2001 | Hosokura et al. | |
| 2002/0053967 | A1 | 5/2002 | Shikama et al. | |
| 2003/0044610 | A1 | 3/2003 | Hosokura et al. | |
| 2005/0167639 | A1 | 8/2005 | Hoshio et al. | |
| 2005/0181684 | A1 | 8/2005 | Ito et al. | |
| 2007/0014075 | A1 | 1/2007 | Ritter et al. | |
| 2007/0247268 | A1 | 10/2007 | Oya et al. | |
| 2010/0052838 | A1 | 3/2010 | Matsuta et al. | |
| 2010/0092740 | A1 | 4/2010 | Motoki et al. | |
| 2010/0201472 | A1 | 8/2010 | Le et al. | |
| 2011/0051314 | A1 * | 3/2011 | Sakurai | B23K 1/0016 361/321.1 |
| 2011/0122540 | A1 | 5/2011 | Ogawa et al. | |
| 2011/0260825 | A1 | 10/2011 | Doljack et al. | |
| 2012/0154099 | A1 | 6/2012 | Fukuda et al. | |
| 2012/0297610 | A1 | 11/2012 | Yamamoto et al. | |
| 2013/0222101 | A1 | 8/2013 | Ito et al. | |
| 2013/0229251 | A1 | 9/2013 | Liao et al. | |
| 2013/0249664 | A1 | 9/2013 | Tonoyama et al. | |
| 2014/0009524 | A1 | 1/2014 | Ogawa | |
| 2014/0063683 | A1 | 3/2014 | Gu et al. | |
| 2014/0167897 | A1 | 6/2014 | Choi et al. | |
| 2014/0292460 | A1 | 10/2014 | Kim et al. | |
| 2015/0016019 | A1 * | 1/2015 | Chae | H01G 4/2325 361/301.4 |
| 2015/0028983 | A1 | 1/2015 | Ryu et al. | |
| 2015/0145627 | A1 | 5/2015 | Sim et al. | |
| 2015/0325369 | A1 * | 11/2015 | Inoue | H01C 7/04 336/200 |
| 2015/0371752 | A1 | 12/2015 | Park et al. | |
| 2016/0012962 | A1 | 1/2016 | Lee et al. | |
| 2016/0217920 | A1 | 7/2016 | Choi et al. | |
| 2016/0260535 | A1 | 9/2016 | Kubota et al. | |
| 2016/0276089 | A1 | 9/2016 | Inoue et al. | |
| 2016/0314889 | A1 * | 10/2016 | Ryu | H01F 41/0246 |
| 2017/0169930 | A1 | 6/2017 | Kudo et al. | |
| 2018/0166218 | A1 * | 6/2018 | Noda | H01G 4/224 |
| 2018/0277296 | A1 * | 9/2018 | Endo | H01F 41/046 |
| 2019/0252113 | A1 * | 8/2019 | Ku | H01F 41/042 |
| 2020/0168391 | A1 | 5/2020 | Yang et al. | |

FOREIGN PATENT DOCUMENTS

| | | | | | |
|---|---|---|---|---|---|
| JP | 2003-059742 | A | | 2/2003 | |
| JP | 2005-217268 | A | | 8/2005 | |
| JP | 2007-067214 | A | | 3/2007 | |
| JP | 2010-093113 | A | | 4/2010 | |
| JP | 2011-108966 | A | | 6/2011 | |
| JP | 2012-089765 | A | | 5/2012 | |
| JP | 2020202299 | A | * | 12/2020 | H01F 17/0013 |
| WO | WO-2014119564 | A1 | * | 8/2014 | C23C 18/1641 |
| WO | WO-2015115180 | A1 | * | 8/2015 | H01F 17/0033 |
| WO | WO-2020195523 | A1 | * | 10/2020 | H10D 1/692 |
| WO | WO-2022065004 | A1 | * | 3/2022 | H01G 4/012 |

* cited by examiner

ELECTRONIC COMPONENT, AND METHOD OF MANUFACTURING THEREOF

CROSS-REFERENCE TO RELATED APPLICATION

This application is the continuation application of U.S. patent application Ser. No. 15/011,150 filed on Jan. 29, 2016, which claims the benefit of priority to Korean Patent Application No. 10-2015-0015309, filed on Jan. 30, 2015 with the Korean Intellectual Property Office, the entirety of which is incorporated herein by reference.

TECHNICAL FIELD

The present disclosure relates to an electronic component, a manufacturing method thereof, and a board having the same.

BACKGROUND

An inductor, an electronic component, is a representative passive element configuring an electronic circuit together with a resistor and a capacitor to remove noise.

An inductor may be manufactured by forming an internal coil part in a magnetic body and forming external electrodes connected to an internal coil part on an outer portion of the magnetic body.

SUMMARY

An aspect of the present disclosure provides an electronic component capable of preventing a contact defect between an internal coil part and external electrodes, increasing a volume of a magnetic body to improve inductance, and decreasing manufacturing cost, a manufacturing method thereof, and a board having the same.

According to an aspect of the present disclosure, an electronic component includes: a magnetic body containing magnetic metal powder; and external electrodes disposed on an outer portion of the magnetic body, wherein the external electrodes include first plating layers formed to directly contact the magnetic body.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
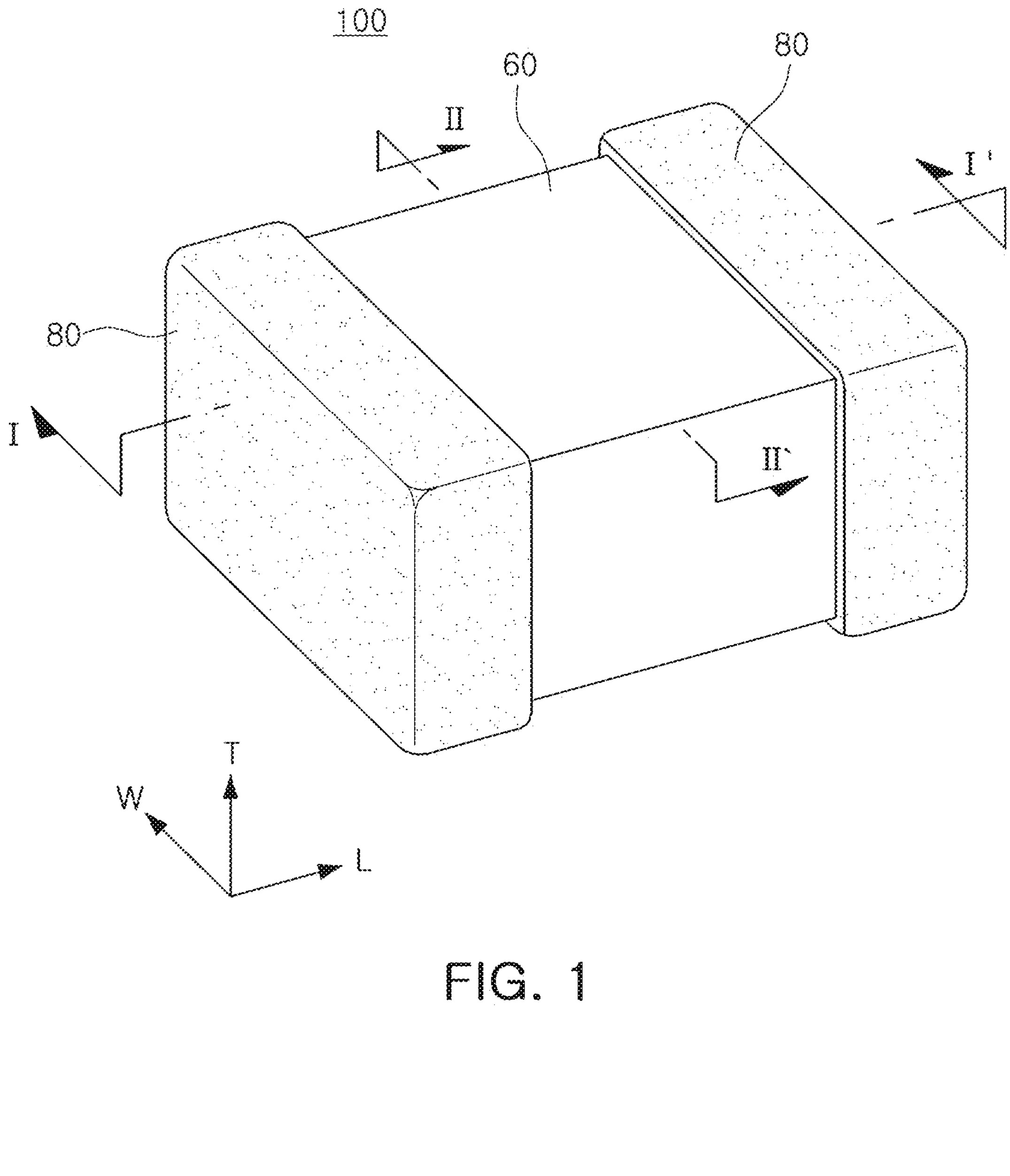
FIG. 1 is a perspective view illustrating an electronic component according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "upper," or "above" other elements would then be oriented "lower," or "below" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Electronic Component

Hereinafter, an electronic component according to an exemplary embodiment, particularly a thin film type inductor, will be described. However, the electronic component according to the exemplary embodiment is not necessarily limited thereto.

Figure 2:
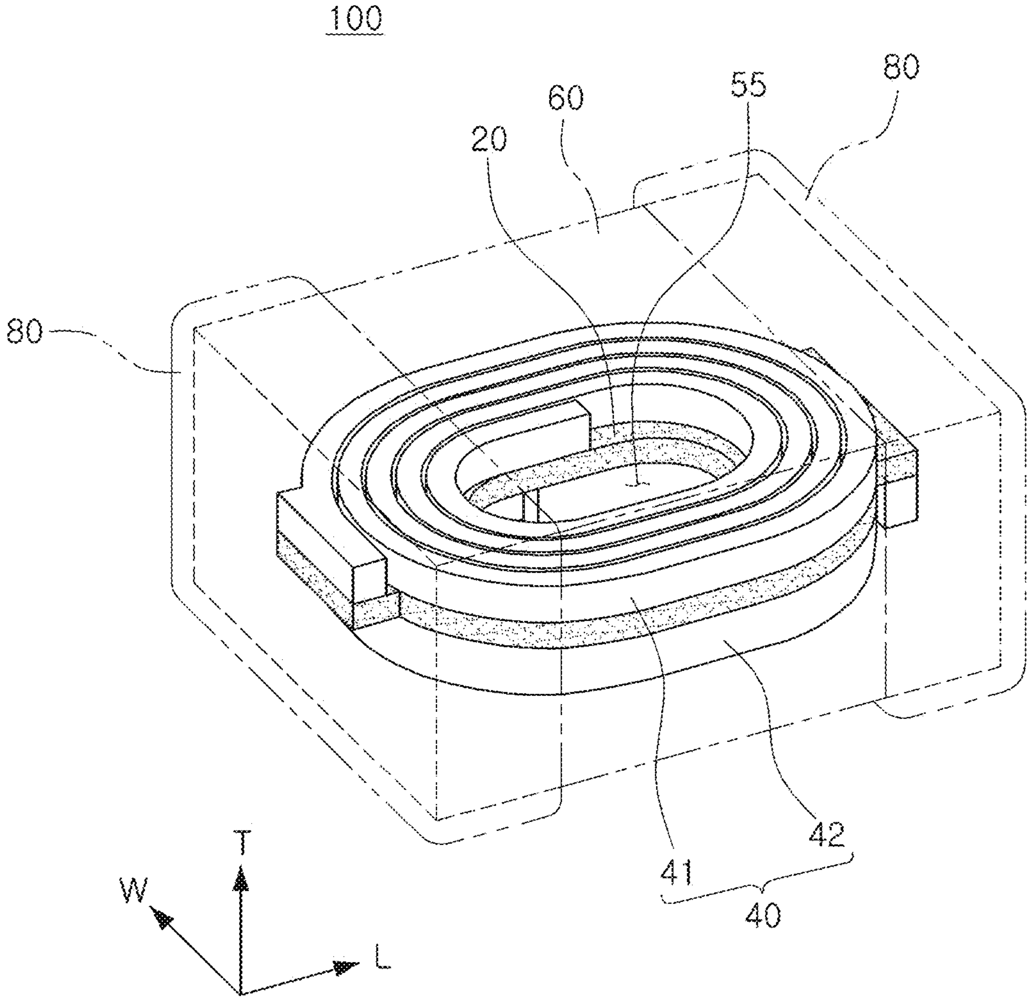
FIG. 2 is a perspective view illustrating the electronic component according to the exemplary embodiment in the present disclosure so that an internal coil part thereof is visible.
Figure 3:
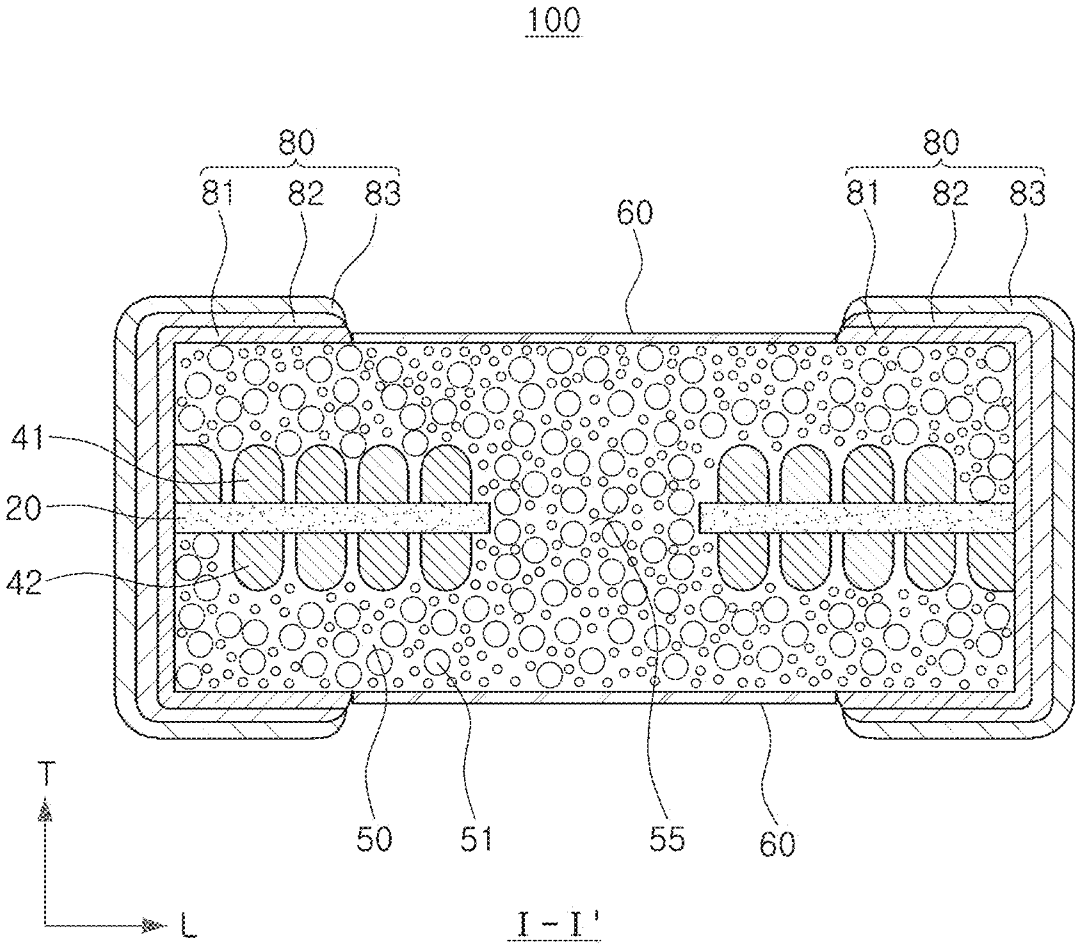
FIG. 3 is a cross-sectional view taken along line I-I' of FIG. 1.
Figure 4:
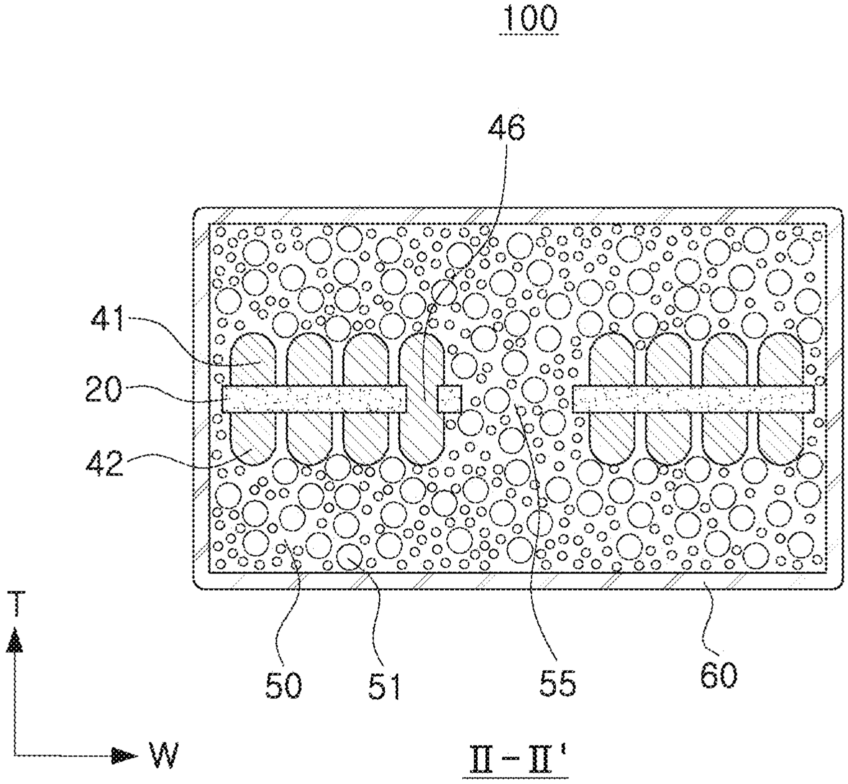
FIG. 4 is a cross-sectional view taken along line II-II' of FIG. 1.

FIG. 1 is a perspective view illustrating an electronic component according to an exemplary embodiment, FIG. 2 is a perspective view illustrating the electronic component according to the exemplary embodiment in the present disclosure so that an internal coil part thereof is visible, FIG. 3 is a cross-sectional view taken along line I-I' of FIG. 1, and FIG. 4 is a cross-sectional view taken along line II-II' of FIG. 1.

Referring to FIGS. 1 through 4, as an example of the electronic component, a thin film type chip inductor used in a power line of a power supply circuit is disclosed.

An electronic component 100 according to the exemplary embodiment may include a magnetic body 50, an internal coil part 40 buried in the magnetic body 50, and external electrodes 80 disposed on an outer portion of the magnetic body 50.

In the electronic component 100 according to the exemplary embodiment, a 'length' direction refers to an 'L' direction of FIG. 1, a 'width' direction refers to a 'W' direction of FIG. 1, and a 'thickness' direction refers to a 'T' direction of FIG. 1.

The magnetic body 50 may contain a magnetic metal powder 51.

The magnetic metal powder 51 may be crystalline or amorphous metal powder containing any one or more selected from the group consisting of iron (Fe), silicon (Si), boron (B), chromium (Cr), aluminum (Al), copper (Cu), niobium (Nb), and nickel (Ni).

For example, the magnetic metal powder 51 may be an Fe—Si—B—Cr based amorphous metal powder, but is not limited thereto.

A particle diameter of the magnetic metal powder 51 may be 0.1 μm to 30 μm, and at least two kinds of magnetic metal powders having different average particle diameters may be mixed with each other.

A filling rate may be improved by mixing at least two kinds of magnetic metal powders having different average particle diameters, thereby securing high permeability and preventing a decrease in efficiency caused by a core loss at a high frequency and high current.

The magnetic metal powder 51 may be contained in a form in which the magnetic metal powder is dispersed in a thermosetting resin.

The thermosetting resin may be, for example, an epoxy resin, a polyimide resin, or the like.

First and second internal coil parts 41 and 42 may be formed by connection of a first coil conductor 41 formed on a first surface of an insulating substrate 20 disposed in the magnetic body 50 and a second coil conductor 42 formed on a second surface of the insulating substrate 20 opposing the first surface thereof.

Each of the first and second coil conductors 41 and 42 may be in a form of a planar coil formed on the same plane of the insulating substrate 20.

The first and second coil conductors 41 and 42 may have a spiral shape, and the first and second coil conductors 41 and 42 formed on the first and second surfaces of the insulating substrate 20, respectively, may be electrically connected to each other through a via 46 penetrating through the insulating substrate 20.

The first and second coil conductors 41 and 42 may be formed on the insulating substrate 20 by performing an electroplating method. However, a formation method of the first and second coil conductors 41 and 42 is not limited thereto.

The first and second coil conductors 41 and 42 and the via 46 may be formed of a metal having excellent electric conductivity. For example, the first and second coil conductors 41 and 42 and the via 46 may be formed of silver (Ag), palladium (Pd), aluminum (Al), nickel (Ni), titanium (Ti), gold (Au), copper (Cu), platinum (Pt), an alloy thereof, or the like.

The first and second coil conductors 41 and 42 may be coated with an insulating film (not illustrated) to thereby not directly contact a magnetic material forming the magnetic body 50.

The insulating substrate 20 may be, for example, a polypropylene glycol (PPG) substrate, a ferrite substrate, a metal based soft magnetic substrate, or the like.

The insulating substrate 20 may have a through-hole formed in a central portion thereof to penetrate through the central portion thereof, wherein the through-hole may be filled with a magnetic material to form a core part 55.

As the core part 55 filled with the magnetic material is formed inside the internal coil part 40, inductance may be improved.

Although a case in which the internal coil part 40 includes the coil conductors 41 and 42 formed on the insulating substrate 20 by plating is described with reference to FIGS. 2 and 3, the internal coil part is not limited thereto. That is, the internal coil part may have any shape as long as the internal coil part may be disposed in the magnetic body to generate a magnetic flux by a current applied thereto.

One end portion of the first coil conductor 41 forming the internal coil part 40 may be extended to thereby be exposed to a first end surface of the magnetic body 50 in the length (L) direction, and one end portion of the second coil conductor 42 may be extended to thereby be exposed to a second end surface of the magnetic body 50 in the length (L) direction opposing the first end surface thereof The end portions of the first and second coil conductors 41 and 42 exposed to the two end surfaces of the magnetic body 50 in the length (L) direction may be electrically connected to the external electrodes 80 disposed on the outer portion of the magnetic body 50.

The external electrodes 80 of the electronic component 100 according to the exemplary embodiment may include first plating layers 81 formed to directly contact the magnetic body 50.

That is, the first plating layers 81 may be formed on a surface of the magnetic body 50 by direct plating.

The first plating layers 81 may be Cu plating layers, which have excellent electrical conductivity and an inexpensive material cost, but are not limited thereto.

Since the first plating layers 81 are formed by plating, the first plating layers 81 may not contain a glass component and a resin.

In a case of curing a magnetic metal powder-resin composite to manufacture a magnetic body, generally, external electrodes are formed using a conductive resin paste containing a conductive metal and a resin. In this case, as the conductive metal contained in the conductive resin paste, silver (Ag) having low specific resistance is mainly used, but a material cost is high, and a contact defect with an internal coil part frequently occurs, and thus contact resistance is excessively increased.

Therefore, according to the exemplary embodiment, occurrence of the contact defect between the internal coil part and the external electrodes may be prevented by forming the external electrodes 80 including the first plating layers 81 formed by direct plating on the surface of the magnetic body 50.

In the electronic component 100 according to the exemplary embodiment, the first plating layers 81 may be formed on the surface of the magnetic body 50 by direct plating due to the magnetic metal powder 51 contained in the magnetic body 50.

Therefore, since a process of forming the external electrodes using the conductive resin paste, particularly the conductive resin paste containing silver (Ag) of which the material cost is high, may be excluded, manufacturing cost may be decreased.

Further, in a case of forming the external electrodes using the conductive resin paste, it may be difficult to adjust a coating thickness of the conductive resin paste, and thus the external electrodes are formed to be thick, and a volume of the magnetic body cannot but decrease in accordance with an increase in the thickness of the external electrode.

However, since the external electrodes 80 of the electronic component 100 according to the exemplary embodiment are formed on the surface of the magnetic body 50 by direct plating, it may be easy to adjust a thickness, and the external electrodes may be formed to have a reduced thickness. Therefore, the volume of the magnetic body 50 may be increased, and inductance, DC-bias characteristics, efficiency, and the like, may be improved.

The external electrodes 80 of the electronic component 100 according to the exemplary embodiment may further include second plating layers 82 formed on the first plating layers 81 and third plating layers 83 formed on the second plating layers 82.

The second and third plating layers 82 and 83 may be formed by plating, and since the second and third plating layers 82 and 83 are formed by plating similarly to the first plating layers 81, the second and third plating layers 82 and 83 may not contain the glass component and the resin.

The second plating layers 82 may be Ni plating layers, and the third plating layers 83 may be Sn plating layers, but the second and third plating layers 82 and 83 are not limited thereto.

The third plating layers 83, which are outermost layers of the external electrodes 80, may be formed as the Sn plating layers, and thus when the electronic component 100 is mounted on a circuit board, an adhesion property with solder may be improved.

The second plating layers 82 may be formed as the Ni plating layers, and thus connectivity between the first plating layers 81 formed as the Cu plating layers and the third plating layers 83 formed as the Sn plating layers may be improved.

The external electrodes 80 may be formed on the first and second end surfaces of the magnetic body 50 in the length (L) direction, respectively, and may be extended to first and second side surfaces of the magnetic body 50 in the width (W) direction and first and second main surfaces thereof in the thickness (T) direction, which contact the first and second end surfaces of the magnetic body 50.

However, a shape of the external electrodes of the electronic component 100 according to the exemplary embodiment is not necessarily limited thereto, and the external electrodes may have any shape as long as the external electrodes may be connected to an end portion of the internal coil part 40 exposed to at least one surface of the magnetic body 50.

Meanwhile, an insulating layer 60 may be formed on the surface of the magnetic body 50.

The insulating layer 60 may be formed on a region of the magnetic body 50 except for a region of the magnetic body 50 on which the external electrodes 80 are formed.

In the electronic component 100 according to the exemplary embodiment, the magnetic metal powder 51 may be contained in the magnetic body 50, and the first plating layers 81 may be formed on the surface of the magnetic body 50 by direct plating due to the magnetic metal powder 51.

In other words, in a case of plating the magnetic body 50 containing the magnetic metal powder 51 as is, the entire surface of the magnetic body 50 may be plated as well as the region of the magnetic body 50 on which the external electrodes need to be formed.

Therefore, when the plating is performed in order to form the external electrodes, there is a need to prevent the region of the magnetic body except for the region on which the external electrodes will be formed from being plated by the magnetic metal powder.

Therefore, according to the exemplary embodiment, generation of plating spread in the region of the magnetic body 50 except for the region thereof on which the external electrodes will be formed may be prevented by performing plating after forming the insulating layer 60 on the region of the magnetic body except for a formation site of the first plating layers 81 before forming the first plating layers 81 on the surface of the magnetic body 50 by plating.

Figure 5:
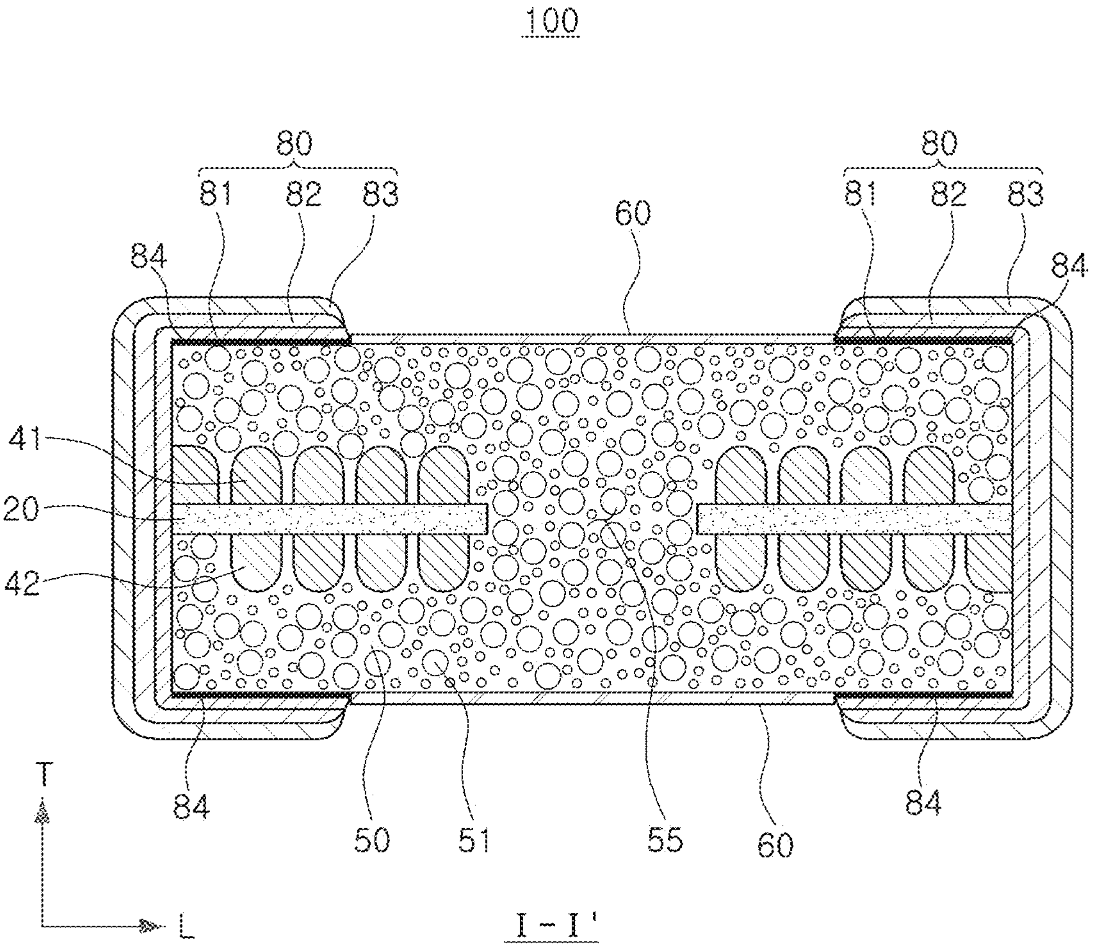
FIG. 5 is a cross-sectional view of an electronic component according to another exemplary embodiment in the present disclosure in a length-thickness (L-T) direction.

FIG. 5 is a cross-sectional view of an electronic component according to another exemplary embodiment in a length-thickness (L-T) direction.

Referring to FIG. 5, the electronic component 100 according to another exemplary embodiment may further include surface electrode layers 84 formed on first and second main surfaces of a magnetic body 50 in the thickness (T) direction.

The surface electrode layers 84 may be formed on portions of both the first and second surfaces of the magnetic body 50 to improve adhesive strength of external electrodes 80 extended to both the first and second main surfaces of the magnetic body 50.

The surface electrode layers 84 may be formed by applying a conductive paste using a printing method or a thin film method such as a sputtering method, or the like, but a manufacturing method of the surface electrode layers 84 is not limited thereto.

The surface electrode layers 84 may be formed of a metal having excellent electrical conductivity. For example, the surface electrode layers 84 may contain silver (Ag), palladium (Pd), aluminum (Al), nickel (Ni), titanium (Ti), gold (Au), copper (Cu), platinum (Pt), an alloy thereof, or the like.

In a case of forming the surface electrode layers 84, adhesive strength of the external electrodes 80 when the electronic component 100 is mounted on a circuit board may be further improved. However, when there is no need to improve adhesive strength of the external electrodes 80, there is no need to form the surface electrode layers 84.

In the electronic component 100 according to the exemplary embodiment, even though the surface electrode layers 84 are not formed, the external electrodes 80 may be formed by plating due to magnetic metal powder 51 contained in the magnetic body 50, and a width of portions of the external electrodes 80 extended to both the first and second main surfaces of the magnetic body may be adjusted by adjusting a formation region of the insulating layer 60.

In other words, in the electronic component 100 according to the exemplary embodiment, even if the surface electrode layers 84 are not formed, there is no difficulty in forming the external electrodes 80 by plating.

Configurations overlapping configurations of the electronic component according to the exemplary embodiment described above except for the surface electrode layers 84 may be equally applied.

Method of Manufacturing Electronic Component

Hereinafter, a method of manufacturing an electronic component 100 according to an exemplary embodiment will be described.

First, an internal coil part 40 may be formed.

After a via hole is formed in an insulating substrate 20 and a plating resist having an opening is formed on the insulating substrate 20, first and second coil conductors 41 and 42 and a via 46 connecting the first and second coil conductors 41 and 42 to each other may be formed by filling the via hole and the opening with a conductive metal using a plating method.

The first and second coil conductors 41 and 42 and the via 46 may be formed of a conductive metal having excellent electric conductivity. For example, the first and second coil conductors 41 and 42 and the via 46 may be formed of silver (Ag), palladium (Pd), aluminum (Al), nickel (Ni), titanium (Ti), gold (Au), copper (Cu), platinum (Pt), an alloy thereof, or the like.

However, a formation method of the internal coil part 40 is not necessarily limited to the plating method as described above, and the internal coil part may be formed using a metal wire. That is, any method may be used as long as the internal coil part may be formed in a magnetic body to generate a magnetic flux by a current applied thereto.

An insulating film (not illustrated) coating the first and second coil conductors 41 and 42 may be formed on the first and second coil conductors 41 and 42.

The insulating film (not illustrated) may be formed by a method known in the art, such as a screen printing method, an exposure and development method of a photo resist (PR), a spray application method, or the like.

A core part hole may be formed by removing a central portion of the insulating substrate 20 on which the first and second coil conductors 41 and 42 are not formed.

The insulating substrate 20 may be removed by performing a mechanical drill method, a laser drill method, a sand blast method, a punching method, or the like.

Next, a magnetic body 50 may be formed by stacking magnetic sheets containing magnetic metal powder 51 on and below first and second internal coil parts 41 and 42.

The magnetic sheets may be manufactured in a sheet shape by mixing magnetic metal powder 51 and organic materials such as a thermosetting resin, a binder, a solvent, and the like, with each other to prepare a slurry, applying the slurry at a thickness of several tens of micrometers (μm) on carrier films by a doctor blade method, and then drying the applied slurry.

The magnetic sheet may be manufactured in a form in which the magnetic metal powder 51 is dispersed in a thermosetting resin such as an epoxy resin, polyimide, or the like.

The magnetic body 50 in which the internal coil part 40 is embedded may be formed by stacking, pressing, and curing the magnetic sheets.

In this case, the core part hole may be filled with a magnetic material, thereby forming a core part 55.

Although, in the method of manufacturing an electronic component according to the exemplary embodiment, a process of stacking the magnetic sheet to form the magnetic body 50 in which the internal coil part 40 is embedded is described, the formation method of the magnetic body is not limited thereto. That is, any method may be used as long as a magnetic metal powder-resin composite in which the internal coil part is embedded may be formed.

Figure 6A:
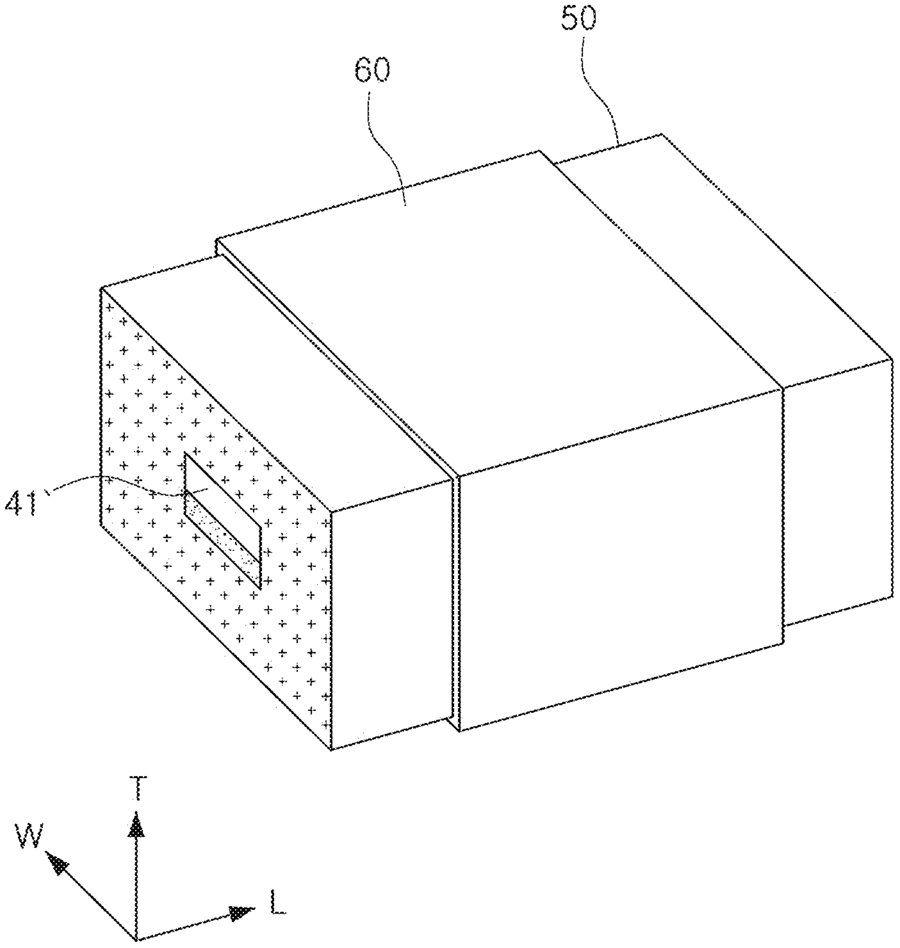
FIGS. 6A and 6B are views illustrating a process of forming external electrodes of the electronic component according to an exemplary embodiment in the present disclosure.
Figure 6B:
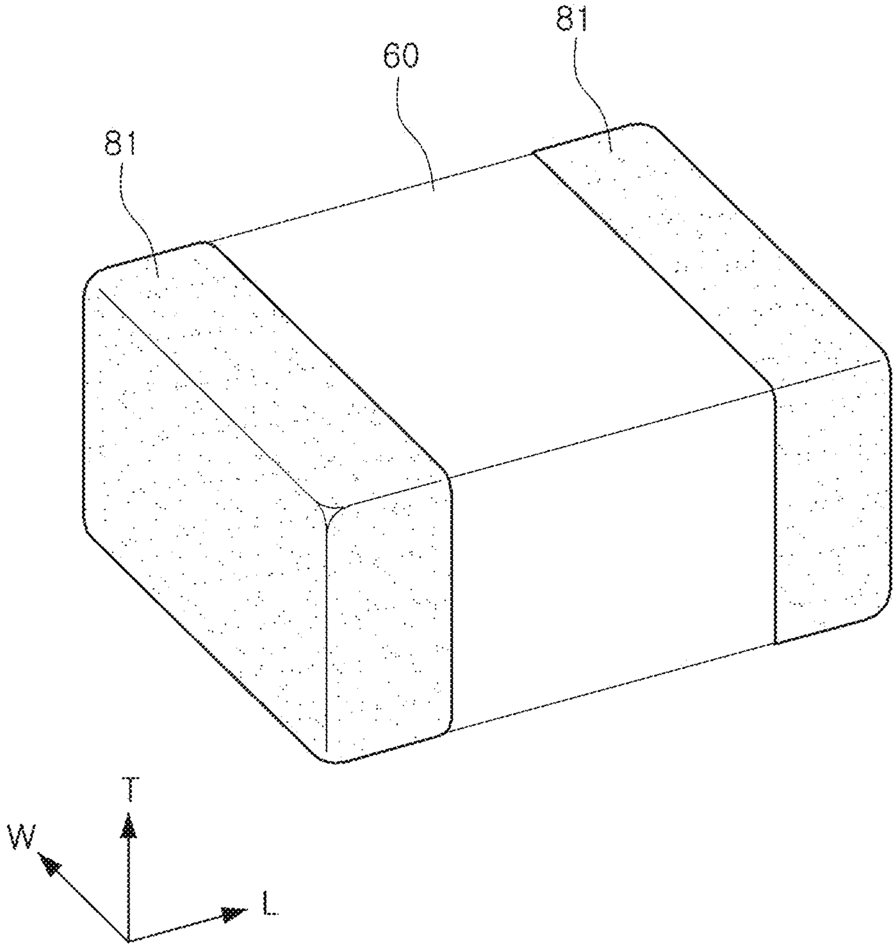

FIGS. 6A and 6B are views illustrating a process of forming external electrodes of the electronic component according to the exemplary embodiment.

Referring to FIG. 6A, an insulating layer 60 may be formed on a region of a surface of the magnetic body 50 except for a region thereof on which external electrodes will be formed.

When the external electrodes of the electronic component 100 according to the exemplary embodiment are formed, in a case of plating the magnetic body 50 containing the magnetic metal powder 51 as is, the entire surface of the magnetic body 50 may be plated as well as the region of the magnetic body 50 on which the external electrodes need to be formed.

Therefore, when the plating is performed in order to form the external electrodes, there is a need to prevent the region of the magnetic body except for the region on which the external electrodes will be formed from being plated by the magnetic metal powder.

Therefore, according to the exemplary embodiment, generation of plating spread in the region of the magnetic body 50 except for the region thereof on which the external electrodes will be formed may be prevented by performing plating after forming the insulating layer 60 on the region of the magnetic body except for a formation site of the first plating layers 81 before forming the first plating layers 81 on the surface of the magnetic body 50 by plating.

Surface electrode layers 84 may be further formed on first and second main surfaces of the magnetic body 50 in a thickness (T) direction.

The surface electrode layers 84 may be formed by applying a conductive paste using a printing method or a thin film method such as a sputtering method, or the like, but a manufacturing method of the surface electrode layers 84 is not limited thereto.

The surface electrode layers 84 may be formed of a metal having excellent electric conductivity. For example, the surface electrode layers 84 may contain silver (Ag), palladium (Pd), aluminum (Al), nickel (Ni), titanium (Ti), gold (Au), copper (Cu), platinum (Pt), an alloy thereof, or the like.

In a case of forming the surface electrode layers 84, adhesive strength of the external electrodes 80 when the electronic component 100 is mounted on a circuit board may be further improved. However, when there is no need to improve adhesive strength of the external electrodes 80, there is no need to form the surface electrode layers 84.

Referring to FIG. 6B, first plating layers 81 may be formed by plating the surface of the magnetic body 50 on which the insulating layer 60 is not formed.

According to the exemplary embodiment, the first plating layers 81 may be formed on the surface of the magnetic body 50 by direct plating due to the magnetic metal powder 51 contained in the magnetic body 50.

The first plating layers 81 may be Cu plating layers having excellent electrical conductivity and an inexpensive material cost, but are not limited thereto.

Since the first plating layers 81 are formed by plating, the first plating layers 81 may not contain a glass component and a resin.

In a case of curing a magnetic metal powder-resin composite to manufacture a magnetic body, generally, external electrodes are formed using a conductive resin paste containing a conductive metal and a resin. In this case, as the conductive metal contained in the conductive resin paste, silver (Ag) having low specific resistance is mainly used, but a material cost is high, and a contact defect with an internal coil part frequently occurs, and thus contact resistance is excessively increased.

Therefore, according to the exemplary embodiment, a contact defect between the internal coil part and the external electrodes may be prevented by directly plating the surface of the magnetic body 50 to form the first plating layers 81 while the external electrodes 80 are formed.

Therefore, since a process of forming the external electrodes using the conductive resin paste, particularly the conductive resin paste containing silver (Ag) of which the material cost is high, may be excluded, manufacturing cost may be decreased.

Further, in a case of forming the external electrodes using the conductive resin paste, it may be difficult to adjust a coating thickness of the conductive resin paste, and thus the external electrodes are formed to be thick, and the thicker the external electrodes, the smaller a volume of the magnetic body.

However, according to the exemplary embodiment, since the external electrodes 80 are formed by directly plating the surface of the magnetic body 50, it may be easy to adjust a thickness, and the external electrodes 80 may be formed to have a reduced thickness. Therefore, the volume of the magnetic body 50 may be increased, and inductance, DC-bias characteristics, efficiency, and the like, may be improved.

According to the exemplary embodiment, second plating layers 82 may be further formed on the first plating layers 81, and third plating layers 83 may be further formed on the second plating layers 82.

The second and third plating layers 82 and 83 may be formed by plating, and since the second and third plating layers 82 and 83 are formed by plating similarly to the first plating layers 81, the second and third plating layers 82 and 83 may not contain the glass component and the resin.

The second plating layers 82 may be Ni plating layers, and the third plating layers 83 may be Sn plating layers, but the second and third plating layers 82 and 83 are not limited thereto.

The third plating layers 83, which are outermost layers of the external electrodes 80, may be formed as the Sn plating layers, and thus when the electronic component 100 is mounted on a circuit board, an adhesion property with solder may be improved.

The second plating layers 82 may be formed as the Ni plating layers, and thus connectivity between the first plating layers 81 formed as the Cu plating layers and the third plating layers 83 formed as the Sn plating layers may be improved.

Except for the description described above, a description of features overlapping those of the electronic component according to the exemplary embodiment described above will be omitted herein.

Board Having Electronic Component

Figure 7:
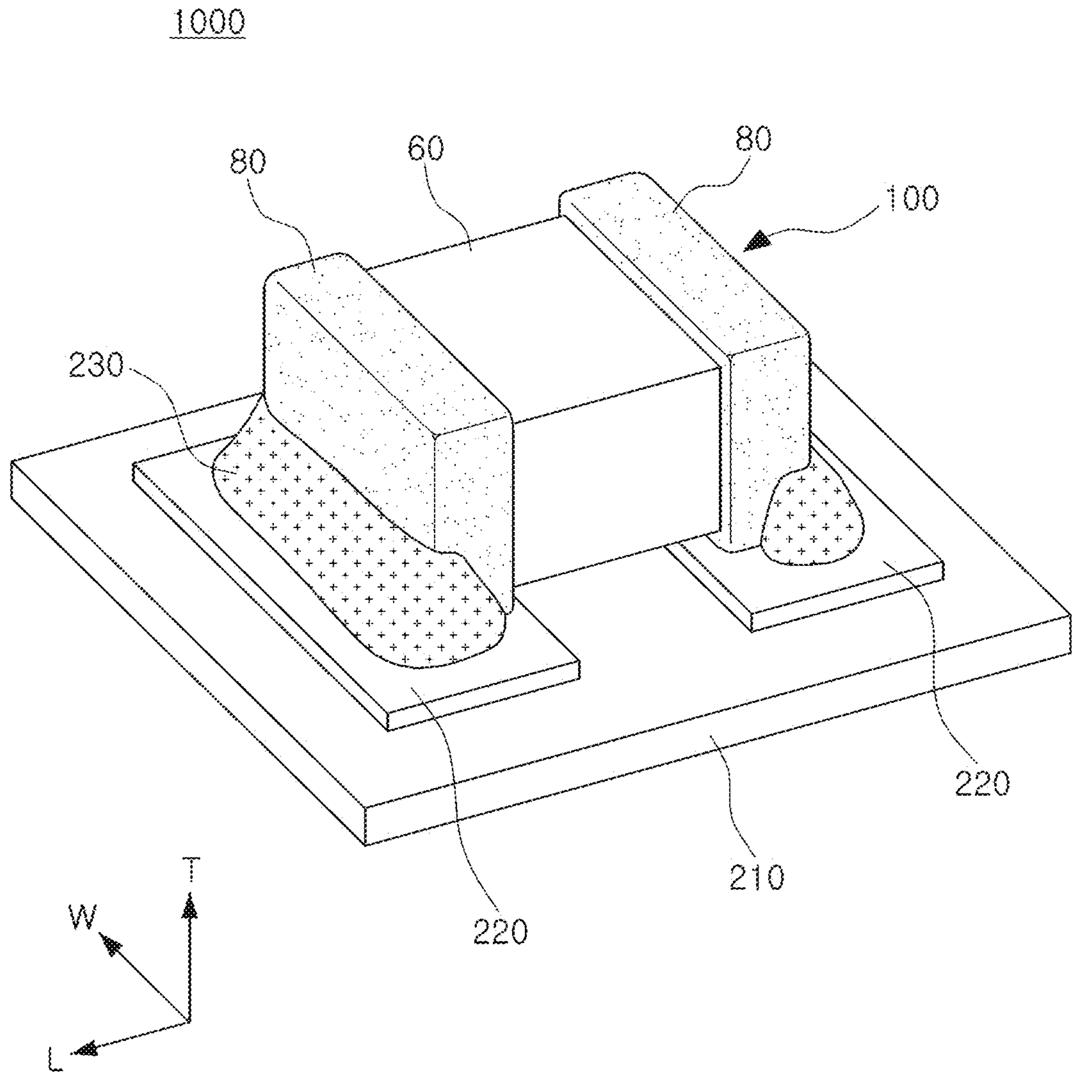
FIG. 7 is a perspective view showing a board on which the electronic component of FIG. 1 is mounted on a circuit board.

FIG. 7 is a perspective view showing a board on which the electronic component of FIG. 1 is mounted on a circuit board.

Referring to FIG. 7, a board 1000 having the electronic component 100 according to the exemplary embodiment may include a circuit board 210 on which a plurality of electrode pads 220 are formed to be spaced apart from each other and the electronic component 100 mounted on the circuit board 210.

The external electrodes 80 disposed on the outer portions of the electronic component 100 may be electrically connected to the circuit board 210 by soldering with solder 230 in a state in which the external electrodes 80 are positioned to contact the electrode pads 220, respectively.

When the electronic component 100 is mounted on the circuit board, an adhesion property with the solder 230 may be improved by forming the third plating layers 83, which are outermost layers of the external electrodes 80, as the Sn plating layers.

Meanwhile, when surface electrode layers 84 are further formed between both the first and second main surfaces of the magnetic body 50 of the electronic component 100 and the first plating layers 81 formed on both the first and second main surfaces thereof, when the electronic component 100 is mounted on the circuit board 210, adhesive strength of the external electrodes 80 may be further improved.

Except for the description described above, a description of features overlapping those of the electronic component according to the exemplary embodiment described above will be omitted herein.

As set forth above, according to exemplary embodiments, a contact defect between the internal coil part and the external electrodes may be prevented, and thus an excessive increase in contact resistance may be prevented.

Further, inductance, DC-bias characteristics, efficiency, and the like, may be improved by increasing the volume of the magnetic body.

In addition, since the process of forming the external electrodes using the conductive resin paste may be excluded, the manufacturing cost may be decreased.

While exemplary embodiments have been shown and described above, it will be apparent to those skilled in the art that modifications and variations could be made without departing from the scope of the present invention as defined by the appended claims.

What is claimed is:

1. An electronic component comprising:

a magnetic body containing magnetic metal particles including an Fe-based alloy;

an external electrode disposed on an outer portion of the magnetic body; and an insulating layer disposed on a region of a surface of the magnetic body, wherein the external electrode includes a first metal layer, the magnetic body includes an internal coil part and an insulating film coated on the internal coil part, the first metal layer is disposed on an external surface of the magnetic body, one or more particles of the magnetic metal particles includes the Fe-based alloy, the insulating layer is in contact with the first metal layer, the first metal layer is a plating layer and free of a glass component, and the magnetic metal particles include at least two kinds of magnetic metal particles having different average particle diameters.

2. The electronic component of claim 1, wherein the external electrode further includes a second metal layer disposed on the first metal layer and a third metal layer disposed on the second metal layer.

3. The electronic component of claim 2, wherein the second metal layer includes a Ni plating layer.

4. The electronic component of claim 3, wherein the third layer includes a Sn plating layer.

5. The electronic component of claim 1, wherein the external electrode is not formed on the region of the surface of the magnetic body where the insulating layer is formed.

6. The electronic component of claim 5, wherein the external electrode further includes a second metal layer disposed on the first metal layer.

7. The electronic component of claim 1, wherein the magnetic body includes an internal coil part disposed therein by connection of coil conductors disposed on first and second surfaces of an insulating substrate.

8. The electronic component of claim 7, wherein the coil conductors are plated coil conductors.

9. The electronic component of claim 1, wherein the first metal layer does not include resin.

10. The electronic component of claim 1, wherein the first metal layer includes a Cu plating layer.

11. The electronic component of claim 1, wherein an inner surface of the first metal layer is in a direct contact with the magnetic body.

12. The electronic component of claim 1, wherein an average particle diameter of the magnetic metal particles ranges from 0.1 μm to 30 μm.

13. The electronic component of claim 1, wherein the magnetic metal particles include any one or more selected from the group consisting of iron (Fe), silicon (Si), boron (B), chromium (Cr), aluminum (Al), copper (Cu), niobium (Nb), and nickel (Ni).

14. The electronic component of claim 1, wherein the magnetic metal particles include an Fe—Si—B—Cr based amorphous metal.

15. The electronic component of claim 1, wherein the magnetic metal particles are dispersed in a thermosetting resin.

* * * * *